Oct. 9, 1928.

L. O. KUHN 1,686,867

GEAR PUMP

Filed Nov. 8, 1926  2 Sheets-Sheet 1

INVENTOR
LEWIS O. KUHN
By Paul, Paul & Moore
ATTORNEYS

Oct. 9, 1928.

L. O. KUHN 1,686,867

GEAR PUMP

Filed Nov. 8, 1926    2 Sheets-Sheet 2

INVENTOR
LEWIS O. KUHN

By Paul, Paul & Moore
ATTORNEYS

Patented Oct. 9, 1928.

1,686,867

UNITED STATES PATENT OFFICE.

LEWIS O. KUHN, OF MINNEAPOLIS, MINNESOTA.

GEAR PUMP.

Application filed November 8, 1926. Serial No 147,046.

This invention relates to improvements in gear pumps, and has for objects to provide a pump of the rotary gear type suitable for general use, and of simple and durable construction, so designed that all wearing parts are removable and replaceable and easily renewable at moderate cost, without disconnecting the pump body or cylinder from the pipe line, in which it is connected.

Another object of the invention is to provide gears constructed so as to prevent loss of power due to "squeeze-points", this object being accomplished by providing radially disposed depressions at each side of each tooth, arranged to lie crosswise of and at each side of the pitch line.

In designing a low-cost rotary gear type of pump, it is necessary that self-driving gears should be used so that external drive gears are not needed. If, in addition it is desired to design a pump which will have long life, it is essential that some means be provided to eliminate the squeeze-points, which points are always present in self-driving gears.

"Squeeze-points" may be defined as those points at which the meshing teeth trap or pocket small quantities of liquid, preventing or practically preventing the escape of the liquid in a radial direction. During such a period, the velocity of the liquid must be momentarily increased to permit the rotation of the gears to continue. The velocity of the liquid can be increased only by increasing the pressure, hence fluctuating pressures. It is this fluctuation of pressure within the pump which causes pulsation of flow, variation of torque in the shafts, and general loss of efficiency. Squeeze-points also cause erosion and therefore rapid wear, due to the cutting action on the metal by ejection of liquid at high velocity from the pockets or traps, at a pressure much higher than the normal discharge pressure.

There are virtually two general classes of gears which can be designed for use in rotary pumps, (1) gears which will drive each other, and (2) gears which will not drive each other. Moreover, gears for the use in rotary pumps may be further divided into classes comprising (1) gears which in meshing will pocket or trap liquid to form squeeze-points, and (2) gears which will not pocket or trap liquid. Gears or rotors of the latter classes must ordinarily have external driving or timing gears keyed to their shafts. Some makers of those gear pumps that fall in the first class, also use pilot gears, but with the object of relieving driving strains and consequent wear off of the pump gears within the pump, and not for the purpose of synchronizing the pumping gears proper.

The features of the invention include all details of construction, both of the pump and of the gears, per se, and their operative relations.

Other objects, certain advantages, and other features of the invention will be set forth in the description of the drawings, forming a part of this application and in said drawings, Figure 1 represents a vertical longitudinal section;

Figure 2:
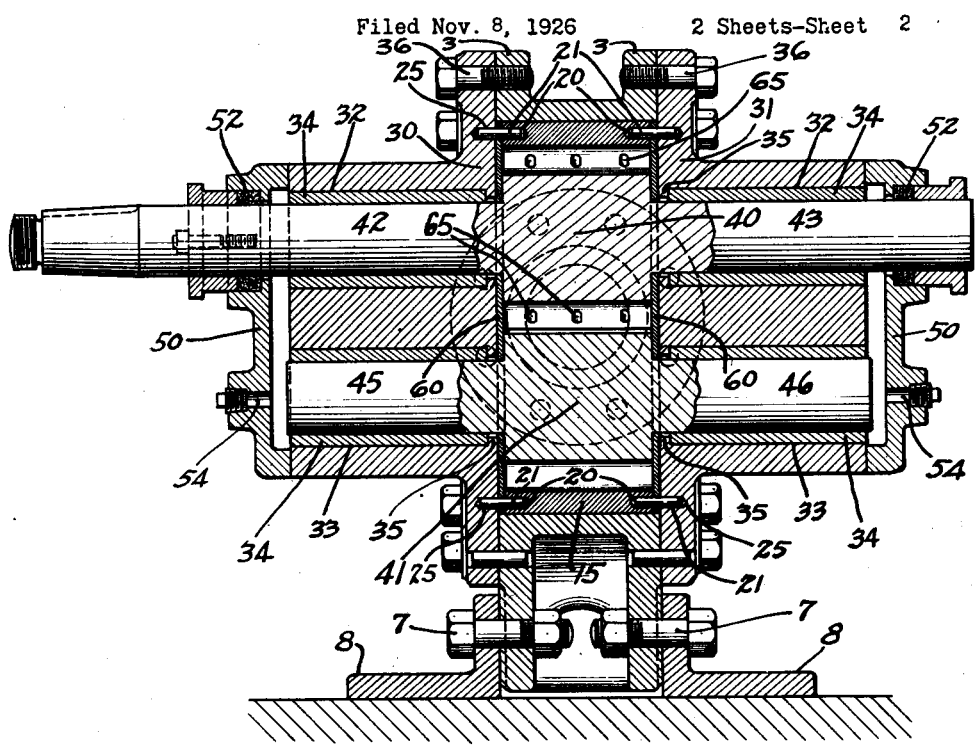
Figure 2 is a vertical transverse section on the line 2—2 of Figure 1.

In the drawings, numeral 1 designates the main pump casing or cylinder providing a smooth bore portion 2. The casing as a casting, is flanged as at 3 at opposite sides, and is provided with a base portion 4 reinforced as by integral ribs. The base is bored as at 6 for the reception of bolts 7 which in this instance secure the foot or base-forming angled castings 8, (see Figure 2). The outer faces of the flanges 3, are coplanar with the outer vertical annular faces of the cylinder, (see Figure 2). The use of base-forming castings 8 provides a knock-down construction, convenient in shipping.

Figure 1:
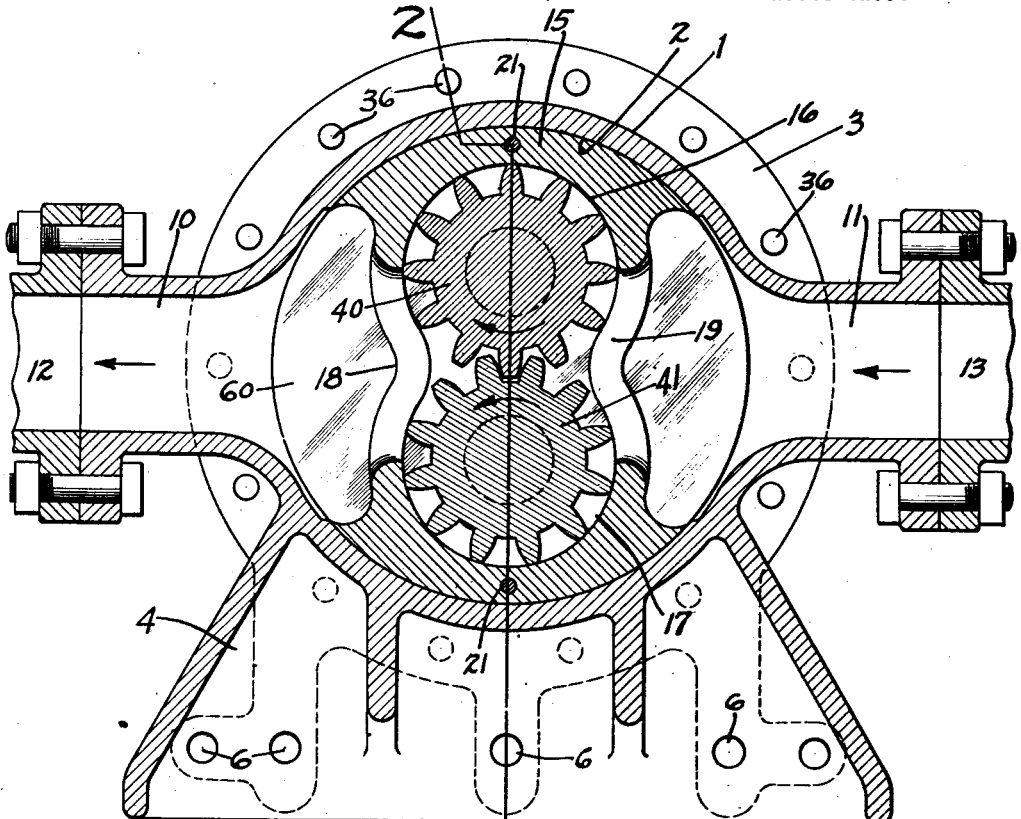

The casting or cylinder is provided with integral tubular extensions 10 and 11 respectively as discharge and suction conduits, depending upon the direction in which the pump drive shaft is rotated. These extensions are diametrically arranged as shown in Figure 1 and are preferably terminally flanged, for connection with correspondingly flanged supply and delivery conduits designated 12 and 13. If desired, these extensions may be threaded, instead of flanged.

Figure 3:
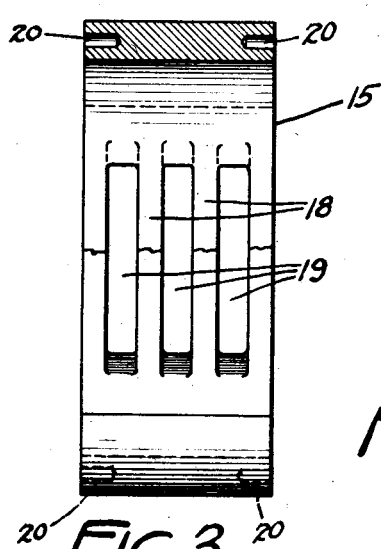
Figure 3 is a sectional elevation of the cylinder liner, providing a gear chamber, and gridlike intake and discharge orifice.

Removably fitted within the cylinder is what I term a cylinder-liner, generally indicated as 15. This liner has the general configuration of a cylinder, and the central pump gear chamber is machined as at 16 and 17, conformably to the size and arrangement of the pump gears. The intersecting bores provided for this purpose are slightly larger in diameter than the outside diameter of the gears, and the width of the liner is slightly greater than the width of the gears. The axial and radial clearance for the gears can be varied and must be varied in proportion to the viscosity of the liquid to be pumped if the best results are to be secured. Liquid enters the gear chamber through grids, one of these grids being supplied at each side, and each in this instance being composed of two bars 18, vertically arranged, and perpendicular to the axes of the gears, and providing three inlet spaces or openings 19, which in this instance are vertically elongated. It will be noted that the grids lie inwardly from the periphery of the liner, (see Figure 1). On each side of the cylinder liner are shown openings 20 for the reception of dowel pins 21, which are provided for determining the correct position of the liner in the original assembly of the pump, and for maintaining the liner in proper position. The cylinder liner is a comparatively simple casting and the final machining operations are simple. This casting can be easily replaced when worn. The grille-like center construction (see Figures 1 and 3) serves as a screen to keep large foreign bodies from reaching the gears, and the grilles also facilitate the removal of the worn casting from the cylinder, inasmuch as they may be broken, if the casting is stuck or corroded within the cylinder, thus permitting removal in two pieces.

An added advantage of this design of renewable cylinder liner, is that the liner may be made of more costly metal than the body of the pump where such metal is desirable, without prohibitive cost. Metals which are more resistant to abrasion, erosion or corrosion, than iron, can be used without excessive cost. Therefore, it will be seen that this chambered removable cylinder liner is an important feature.

The liner is held in position against axial movement, by what may be designated, a pair of closure plates 30, 31. These plates are each provided with a pair of bores 32 and 33, as bearings. The form of plates is substantially the same, and those portions of each plate which have the bores therein, are in the form of lateral extensions, to give a long bearing engagement. In each of the bores is inserted a bearing bushing indicated at 34, and a shoulder 35 is provided at the inner end of each bore to abuttingly receive and prevent inward translation of the bushing. These bushings are formed of bronze or other suitable metal and are preferably pressed into place. The plates are sealingly secured by bolts 36, and act to close the opposite sides of the annular base member.

The gears are designated 40, 41. One of the gears, preferably the upper, is provided with elongated integral shaft extensions respectively designated 42, 43 which pass through and are journaled in the bushings 34. In this instance, the shaft extensions 42 form the drive shaft for the gear, and is suitably tapered, reduced and threaded for connection with a suitable prime driver, not shown. The extensions 42 and 43 are of course axially aligned and each extends to a point outside of the pump casing. In this instance, the lower gear 41 is provided with a similar pair of shaft extensions 45, 46 which however, do not extend beyond the pump casing, as in the case of the extensions of the upper gear.

Reservoir-forming covers 50, each provided with a stuffing box 52, are suitably secured laterally of and flatly against the bearing-forming extensions of the side plates 30, 31. The shafts 42, 43 extend through respective stuffing boxes 52. It will be noted that the ends of the shafts 45, 46 of the lower gear receive oil from the reservoir thus formed. The reservoirs are filled through suitable openings 54.

Figure 4:
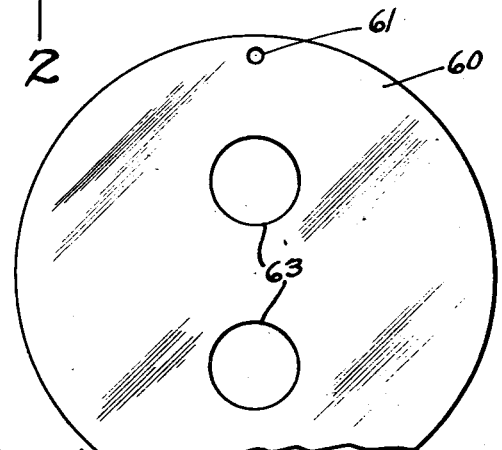
Figure 4 is an inner face view of one of the closure and wearing plates.

Another important feature is the provision of wear plates 60. These plates are for receiving thrust of the end faces of the gears, and may be reversed when worn on one side. The object of the plates is to provide means for maintaining the proper axial clearance between the ends of the gears and the end plates 30. They are not made adjustable for the reason that it is cheaper and easier to renew them, and then, too, the correct needed amount of adjustment would be difficult to ascertain. Like the cylinder liner the wear plates may be made of any desired metal, at reasonable cost, because the same can be made thin and light. The plates are simple and are intended to be symmetrical so that no mistake can be made in replacement. Openings 63 are traversed by the gear shafts, see Figures 2 and 4. Correct alignment is assured, by means of the dowel pins 20 passing through openings 61 in the plates, the same pins also engaging openings 20 and 25 respectively in the liner 15 and end plates 30.

The simplicity of these wear plates 60, is possible only because of the method I have discovered for relieving the squeeze-points, by means of relief grooves cut in the teeth, making lateral ports unnecessary.

It is understood that the width of the gears is almost equal to the width of the cylinder liner, and that the diameter of the gears is almost equal to the diameter of respective cylinder liner bores, which form the gear chamber. For all practical purposes, the leakage or slip past the ends of the gears (lateral clearance) and around the pump, between the cylinder walls and the tips of the teeth (radial clearance) is negligible, and if the pump is to continue to operate satisfactorily over a long period of time, the lateral or axial and the radial clearance just mentioned must be kept constant. This can be done only by providing means for renewing the cylinder walls, the inner surfaces of the flanking end plates, and the periphery of the rotors or gears. The cylinder liner and the plates herein provide means for renewing these surfaces easily, quickly and cheaply.

Figures 5, 6, 7:
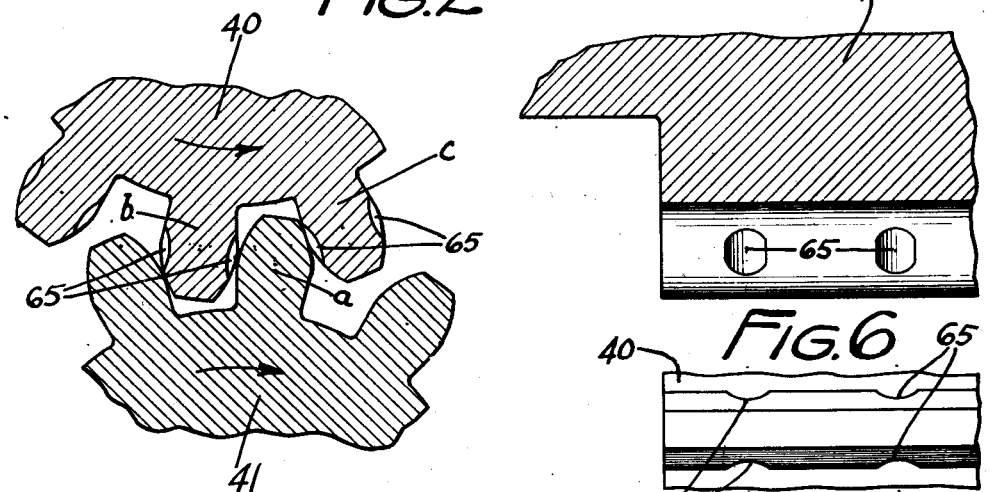
Figure 5 is a detail sectional view showing the gear construction.
Figures 6 and 7 are respectively a section and an end view, showing the gear tooth construction.

The gears 40, 41, the detailed construction of which is shown in Figure 5, may have any suitable form of tooth. The gears may be of steel forged integral with the shafts, or may be made separately and of metal different from the shaft metal. The gear teeth may be of any form and in cases where low first costs is not of primary importance, and where external pilot gears are considered necessary, it is intended that such constructions are not prohibitive in this invention.

Before proceeding to describe in detail the construction of the gears for preventing squeeze-points, I will briefly describe the principle on which this pump and all other rotary gear types of pumps operate. The direction of rotation of the gears is indicated in Figure 5.

Starting with a dry or empty pump, the rotation of the gears in the direction indicated meshes the gear teeth and squeezes out the air orignally contained in the spaces between the teeth. As the teeth unmesh on the other side, they tend to create a condition of vacuum in the spaces which formerly were filled with air but which air was expelled on the discharge side. These vacuum spaces are immediately filled with air contained in the suction side of the pump. Each tooth space carries air from the suction side of the pump around to the discharge side and the air-filled spaces are emptied into the discharge line, thereby exhausting the air from the suction line, which of course must be air-tight and which must extend beneath the surface of the liquid it is desired to pump. As the air is drawn out of the suction line, a condition of vacuum is produced, or in other words, the normal atmospheric pressure is removed from the surface of the liquid in the suction line, and the atmospheric pressure on the surface of the liquid outside the suction line forces the liquid towards the pump. When the liquid reaches the pump, the action of the pump on the liquid is the same as it was on the air and the tooth spaces or pockets are filled with liquid on the suction side and expelled by the meshing teeth on the discharge side. Rotary gear pumps may be likened to multi-cylinder plunger pumps in which the tooth spaces correspond to the cylinders and the teeth correspond to the plungers and which plungers work into and out of the cylinders with a rotary rolling action instead of with a straight reciprocating motion. The contacts between the teeth of the two gears serve to separate the discharge from the suction side of the pump, and thereby take the place of the suction and discharge valves which must be present in plunger pumps.

In order to eliminate the "squeeze-points", and the erosive and other detrimental effects caused thereby, and due to pocketing of liquid by the teeth, I provide depressions in the teeth of one of the gears, and arrange the depressions on both working faces of each tooth, to extend at both sides of the pitch line. The depressions are of less radial length than the depth of the tooth and are arranged symmetrically across the pitch line. By experimenting, I have found that the best location of and arrangement for the relief grooves is substantially that shown in the drawings.

By an inspection of Figure 5 and referring to the relation of teeth $a$, $b$ and $c$, it will be noted that the opposingly related relief grooves 65, respectively of the teeth $b$ and $c$, respectively engage the working faces of the tooth $a$, at, and at a point above or at the outer side of the pitch line. It will also be noted that since one of the grooves lies symmetrically at opposite sides of the pitch line, relief will be had through one or the other of the depressions during the whole period that the working faces are in contact.

By reference to Figure 5, it will be seen that at certain points in the rotation of the gears, the liquid in one pocket or groove would be trapped, and would have to be expelled in a very small fraction of time through a very small orifice, unless the relief grooves were present to permit relatively free egress of the liquid.

The relief depressions have been described as providing radial outlet for that liquid trapped in the tooth spaces with reference to the discharge side, but they also perform a very important duty on the suction side. By reference to Figure 5, it will be seen that the unmeshing of the teeth tends to form a vucuum in the tooth spaces, before the liquid can enter in a radial direction, except through the "relief depressions". The effect of creating a condition of vacuum in the spaces prior to the opening of the inlet ports tends to cause noisy operation, and this I have elminated by providing the depressions.

I claim as my invention:

1. A device of the class described comprising a pump base having a main bore, and inlet and outlet conduits communicating with the bore, said conduits being horizontally and diametrically related, a liner element as a casting providing a twin-gear chamber, the opposite vertical walls of said chamber, being vertically slotted to provide gridlike intake and discharge orifices arranged for communication with respective conduits, and meshed gears within said chamber, each gear having shafts axially aligned at opposite sides and journaled in said base and bearing plates closing the bore and enclosing the liner, and receiving the shafts and dowels connecting said bearing plates with said liner to permit removal of the bearing plates in an axial direction.

2. A gear having its teeth provided with depressions, said depressions being formed in both working faces of each tooth, and extending at both sides of the pitch line.

3. A gear having its teeth provided with concave depressions, said depressions being formed in both working faces of each tooth, and extending at both sides of the pitch line.

4. A gear having its teeth provided with depressions, said depressions being formed in both working faces of each tooth, and being extended at both sides of the pitch line, substantially symmetrically, the length of said depression being less than the length of the teeth.

5. A gear having each of its teeth provided with depressions, said depressions being formed in both working faces of the tooth and being extended at both sides of the circular pitch line, said depressions being of less radial length than the depth of the tooth, and extending symmetrically at both sides of said circular pitch line but not extending the full length of the tooth.

6. A pump base having a bore, and substantially diametrically related inlet and outlet passages communicating with the bore, a liner fitted in said bore and having a gear chamber, the walls of the liner being formed to provide two series of spaced grid bars arranged to establish communication respectively between the inlet and outlet passages across the gear chamber, the bars being so constructed as to permit their fracture in a manner to permit the liner to be removed in sections.

7. A pump comprising a base having a bore and inlet and outlet conduits communicating with the bore at opposite sides, a liner element fitted within the bore and having a gear chamber, those walls of the chamber opposed to the inlet and outlet conduits each formed to provide a series of spaced grid bars establishing communication with the chamber and said passages, meshed gears within the chamber having shafts extending from opposite sides, and bearing plates closing the bore at opposite sides and secured to the base and having elongated bearings receiving the gear shafts.

8. A pump comprising a base having a bore and inlet and outlet conduits communicating with the bore at opposite sides, a liner element fitted within the bore and having a gear chamber, those walls of the chamber opposed to the inlet and outlet conduits each formed to provide a series of spaced grids establishing communication with the chamber and said passages, meshed gears within the chamber having shafts extending from opposite sides and bearing plates closing the bore at opposite sides and secured to the base and having elongated bearings receiving the gear shafts, and dowels connecting the bearing plates with the liner.

9. A pump comprising a base having a bore and inlet and outlet conduits communicating with the bore at opposite sides, a liner element fitted within the bore and having a gear chamber, those walls of the chamber opposed to the inlet and outlet conduits each formed to provide a series of spaced grids establishing communication with the chamber and said passages, meshed gears within the chamber having shafts extending from opposite sides and bearing plates closing the bore at opposite sides and secured to the base and having elongated bearings receiving the gear shafts, and dowels connecting the bearing plates with the liner, and wear plates interposed between the liner and the bearing, the dowels and gear shafts also passing through said wear plates.

10. A pump base having a bore and outlet and inlet passages at opposite sides of the bore and communicating therewith, a liner fitted within the bore and having a gear chamber having gridded walls establishing communication between the gear chamber and inlet and outlet passages, and opposed to respective passages, bearing elements arranged at opposite sides to close the bore and enclose the grid, and gears within the gear chamber having shafts rotatable in said bearing elements.

11. A pump base having a bore and outlet and inlet passages at opposite sides of the bore and communicating therewith, a liner fitted within and of less area than the bore and having a gear chamber having gridded walls establishing communication between the gear chamber and inlet and outlet passages, bearing elements arranged at opposite sides to close the bore and enclose the grid, gears within the gear chamber having shafts rotatable in said bearing elements, and dowels securing said liner to said bearing elements, the arrangement being such that the dowels are released when the bearing elements are moved in an axial direction.

12. A pump comprising a base having a bore extending therethrough, and inlet and outlet passages leading into the bore from opposite sides, a liner fitted within and of less area than the bore and substantially diametrically related to the bore axis in a direction substantially at right angles to the axes of the outlet and inlet passages, and providing a gear chamber, the walls of the liner being slotted to provide a set of grids at each opposite side of the chamber establishing communication between said passages and the gear chamber, meshing gears in said chamber each having a shaft extending in opposite directions, bearing plates secured at opposite sides against the base and receiving the shafts and said elements closing the bores, and enclosing the liner, and dowel pins connecting the liner to the bearing plates to secure the liner against displacement.

13. A pump comprising a base having a bore extending therethrough, and inlet and outlet passages leading into the bore from opposite sides, a liner fitted within the bore and providing a gear chamber, the walls of the liner being slotted to provide a set of grids at each opposite side of the chamber substantially perpendicular to the axes of the outlet and inlet passages and establishing communication between said passages and the gear chamber, meshing gears in said chamber each having a shaft extending in opposite directions, bearing plates secured at opposite sides against the base and receiving the shafts and said elements closing the bores, and enclosing the liner, and dowel pins connecting the liner to the bearing plates to secure the liner against displacement.

14. A pump base having a bore, and substantially diametrically related inlet and outlet passages communicating with the bore, a liner fitted in said bore and having a gear chamber, the walls of the liner being formed to provide two series of spaced grid bars opposingly arranged to establish communication respectively between the inlet and outlet passages across the gear chamber, the bars being so constructed as to be fractured in the manner to permit a liner to be removed in sections, the area of contact between the liner and bore being substantially less than the surface area of the bore and said liner extending from end to end of the bore.

In witness whereof, I have hereunto set my hand this 4th day of November, 1926.

LEWIS O. KUHN.